（12） United States Patent
Shono

(10) Patent No.: US 7,123,184 B2
(45) Date of Patent: Oct. 17, 2006

(54) TRANSMIT-RECEIVE FM-CW RADAR APPARATUS

(75) Inventor: Masayoshi Shono, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 147 days.

(21) Appl. No.: 10/802,642

(22) Filed: Mar. 17, 2004

(65) Prior Publication Data

US 2004/0183716 A1    Sep. 23, 2004

(30) Foreign Application Priority Data

Mar. 20, 2003   (JP)   ............................. 2003-078246

(51) Int. Cl.
*G01S 7/35*   (2006.01)
*G01S 13/58*  (2006.01)

(52) U.S. Cl. .......................... 342/89; 342/70; 342/107; 342/109

(58) Field of Classification Search ................... 342/82, 342/89
See application file for complete search history.

(56) References Cited

U.S. PATENT DOCUMENTS

| | | | | |
|---|---|---|---|---|
| 4,370,652 | A | * | 1/1983 | Lucchi ........................ 342/101 |
| 5,159,707 | A | * | 10/1992 | Mogi et al. ................... 455/134 |
| 5,448,244 | A | * | 9/1995 | Komatsu et al. ............. 342/155 |
| 5,694,130 | A | * | 12/1997 | Suzuki et al. ................ 342/70 |
| RE36,095 | E | * | 2/1999 | Urabe et al. ................. 342/133 |

(Continued)

FOREIGN PATENT DOCUMENTS

EP        0 795 761 A2       9/1997

(Continued)

OTHER PUBLICATIONS

Patent Abstract of Japan, Publication Number 2002189074A, Published on Jul. 5, 2002, in the name of Kawakubo.

(Continued)

*Primary Examiner*—Thomas H. Tarcza
*Assistant Examiner*—Matthew M. Barker
(74) *Attorney, Agent, or Firm*—Christie, Parker & Hale, LLP

(57) ABSTRACT

A transmit-receive FM-CW radar apparatus according to one mode of the invention comprises: a mixer for downconverting an IF signal; a switch provided on the input side of the mixer; and a switch controller for controlling the switch on and off in different modes and selecting the IF signal in the different modes for supply to said mixer. A transmit-receive FM-CW radar apparatus according to another mode of the invention comprises: a mixer for downconverting an IF signal; a switch for turning on and off a local signal to be supplied to the mixer; and a switch controller for controlling the switch on and off in different modes and selecting the local signal in the different modes for supply to the mixer.

6 Claims, 16 Drawing Sheets

U.S. PATENT DOCUMENTS

| | | | |
|---|---|---|---|
| 5,940,029 A * | 8/1999 | Ninomiya et al. | 342/372 |
| 5,973,636 A * | 10/1999 | Okubo et al. | 342/70 |
| 6,031,483 A * | 2/2000 | Urabe et al. | 342/70 |
| 6,040,796 A | 3/2000 | Matsugatani et al. | |
| 6,087,980 A | 7/2000 | Saryo | |
| 6,400,308 B1 * | 6/2002 | Bell et al. | 342/71 |
| 6,583,753 B1 * | 6/2003 | Reed | 342/70 |
| 6,646,589 B1 * | 11/2003 | Natsume | 342/70 |
| 6,664,919 B1 * | 12/2003 | Isaji | 342/109 |
| 6,833,807 B1 * | 12/2004 | Flacke et al. | 342/70 |
| 6,972,711 B1 * | 12/2005 | Shono | 342/92 |

FOREIGN PATENT DOCUMENTS

| | | |
|---|---|---|
| EP | 0 898 174 A1 | 2/1999 |
| EP | 1 324 066 A2 | 7/2003 |
| JP | 10-90397 | 4/1998 |
| JP | H-10-90397 | 4/1998 |
| JP | H-11-148972 | 6/1999 |
| JP | 2002-189074 | 7/2002 |

OTHER PUBLICATIONS

Search Report of Corresponding European Patent Application, dated Aug. 4, 2004.

Saito et al., "An FM-CW Radar Module With Front-End Switching Heterodyne Receiver," Microwave Symposium Digest, 1992, IEEE MTT-S International Albuquerque, NM, USA, Jun. 1-5, 1992, New York, NY, USA, IEEE, US, Jun. 1, 1992, pp. 713-716, XP010062942.

Patent Abstract of Japan No. 10090397 A, Published Apr. 10, 1998, in the name of Komatsu.

* cited by examiner

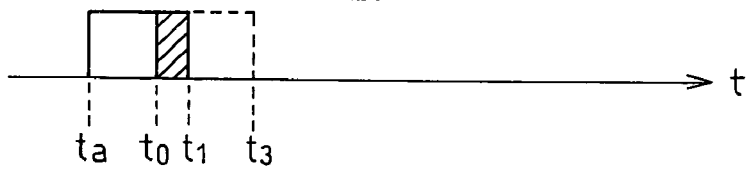
Fig.8A  PORTION CONTAINING SIGNAL FROM SHORT-RANGE TARGET
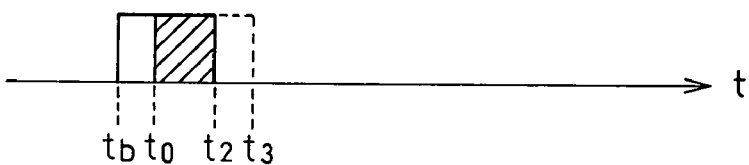
Fig.8B  PORTION CONTAINING SIGNAL FROM MID-RANGE TARGET
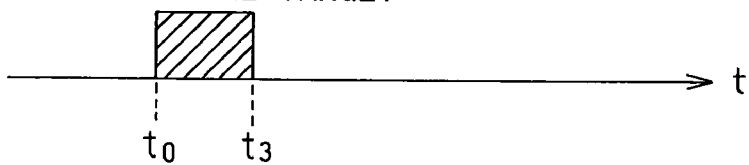
Fig.8C  PORTION CONTAINING SIGNAL FROM LONG-RANGE TARGET
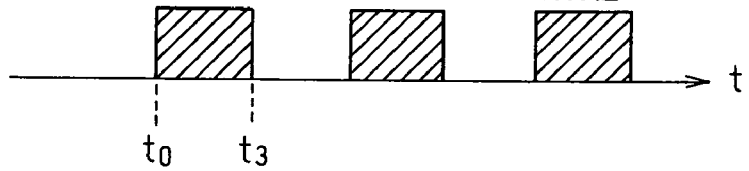
Fig.8D  RECEIVE TIMING INTERVAL

Fig.9A  S1
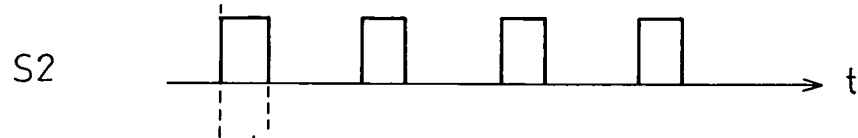
Fig.9B  S2
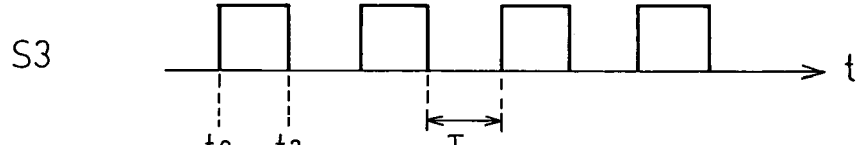
Fig.9C  S3
Fig.9D
Fig.10A  S1
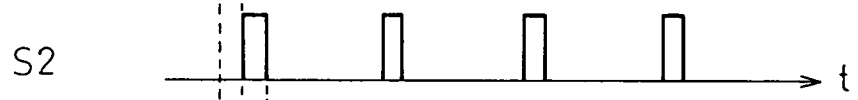
Fig.10B  S2
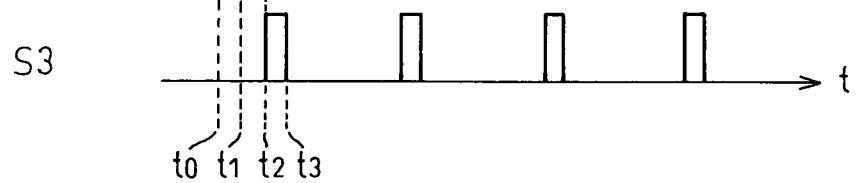
Fig.10C  S3
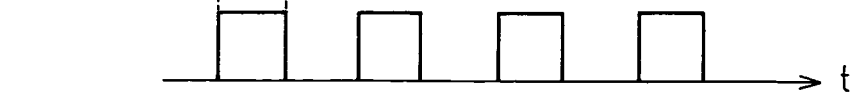
Fig.10D

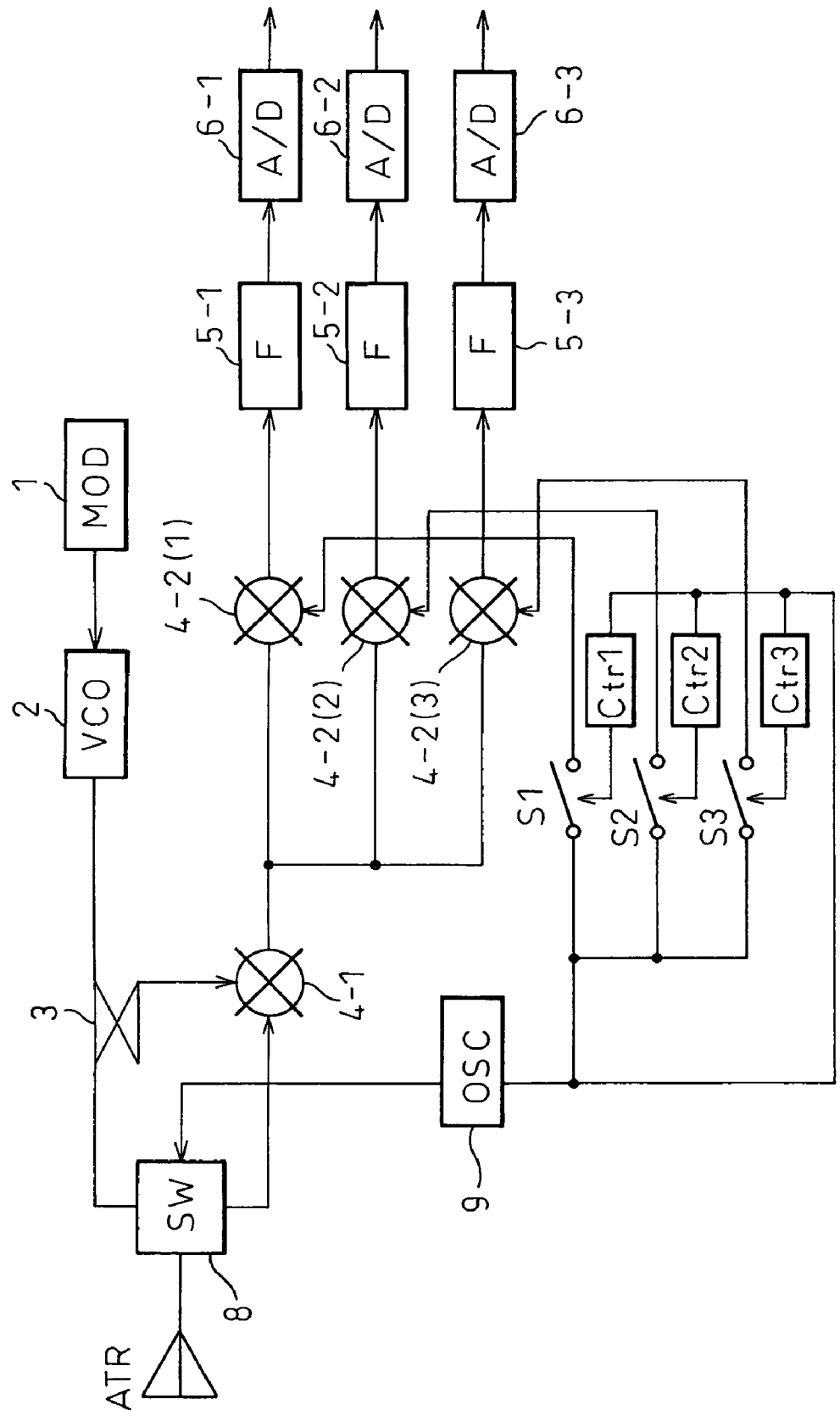

TRANSMIT-RECEIVE FM-CW RADAR APPARATUS

Applicant claims the right to priority from, and incorporates by reference the entire disclosure of Japanese Patent Application No. 2003-78246, filed Mar. 20, 2003.

BACKGROUND OF THE INVENTION

1. Field of the Invention

The present invention relates to an FM-CW radar apparatus that uses a frequency-modulated (FM) continuous wave (CW) transmit signal and, more particularly, to a transmit-receive FM-CW radar apparatus that switches between transmission and reception by time division.

2. Description of the Related Art

FM-CW radar is used as a radar system for measuring the distance, the relative velocity, etc. of a target object. As FM-CW radar can measure the distance and the relative velocity of a vehicle traveling ahead by using a simple signal processing circuit, and as its transmitter and receiver can be constructed with simple circuitry, this type of radar is used as an automotive collision avoidance radar.

There is disclosed as a transmit-receive FM radar a time-division multiplexing FM radar system that does not require the provision of a high-frequency, high-gain receiving amplifier circuit which supplies reflected FM frequencies, received via a transmit-receive common antenna, to a common mixer while amplifying the received frequencies intermittently in time division fashion (refer to Japanese Unexamined Patent Publication No. H10-90397).

There is also disclosed an FM-CW radar apparatus that subtracts FM-AM conversion noise from a beat signal thereby removing the FM-AM conversion noise before the beat signal is input to an A/D converter (refer to Japanese Unexamined Patent Publication No. 2002-189074).

There is further disclosed a transmit-receive FM-CW radar apparatus that can reduce the leakage of noise components between transmitter and receiver (refer to Japanese Unexamined Patent Publication No. 11-148972).

SUMMARY OF THE INVENTION

An object of the present invention is to reduce FM-AM conversion noise in a transmit-receive FM-CW radar apparatus.

A transmit-receive FM-CW radar apparatus which switches between transmission and reception by time division control according to the present invention comprises: a mixer for downconverting an IF signal; a switch provided on an input side of the mixer; and a switch controller for controlling the switch on and off in different modes and selecting the IF signal in the different modes for supply to the mixer.

In one preferred mode of the invention, the radar apparatus comprises a plurality of mixers, each for downconverting the IF signal, and a plurality of switches one each provided on the input side of each of the plurality of mixers, and the switch controller controls the plurality of switches on and off in different modes and selects the IF signal in the different modes for supply to the plurality of mixers respectively (FIG. 7).

In another preferred mode of the invention, the radar apparatus comprises: a selector switch for supplying the IF signal to each of the plurality of mixers by switching a connection thereof between the mixers; and a switching controller for controlling timing for connecting the selector switch to each of the plurality of mixers, and for causing the selector switch to select the IF signal in the different modes for supply to each of the plurality of mixers (FIG. 12).

According to the transmit-receive FM-CW radar apparatus of the present invention, the mixer for downconverting the IF signal is a single mixer, and the radar apparatus includes: a switch for turning on and off the IF signal to be input to the mixer; and a mode selector for controlling the switch on and off in different modes while selecting the on/off mode by switching between the different modes (FIG. 14).

According to the transmit-receive FM-CW radar apparatus of the present invention, the mixer for downconverting the IF signal is a single mixer, and the switch for turning on and off the IF signal to be input to the mixer is provided on the input side of the mixer, wherein the radar apparatus includes a mode controller for turning the switch on and off in a specific mode (FIG. 16).

The different modes consist of a short-range mode for selecting an IF signal containing a signal from a short-range target, a mid-range mode for selecting an IF signal containing a signal from a mid-range target, and a long-range mode for selecting an IF signal containing a signal from a long-range target (FIGS. 9 and 10).

The mode selector switches the mode to any one of the different modes, i.e., the short-range mode, the mid-range mode, or the long-range mode. Alternatively, the mode selector switches the mode sequentially through the short-range mode, the mid-range mode, and the long-range mode (FIGS. 9 and 10).

The specific mode is any one of the above modes, i.e., the short-range mode, the mid-range mode, or the long-range mode (FIGS. 9 and 10).

The different modes consist of a mode for selecting an IF signal corresponding to a portion occupying up to a point about ⅓ from the leading edge of a receive timing interval, a mode for selecting an IF signal corresponding to a portion occupying up to a point about ⅔ from the leading edge of the receive timing interval, and a mode for selecting an IF signal corresponding to an entire portion of the receive timing interval (FIG. 9).

Alternatively, the different modes consist of a mode for selecting an IF signal corresponding to a portion occupying up to a point about ⅓ from the leading edge of a receive timing interval, a mode for selecting an IF signal corresponding to a portion occupying from the point about ⅓ to the point about ⅔ from the leading edge of the receive timing interval, and a mode for selecting an IF signal corresponding to a portion occupying from the point about ⅔ to the point about 3/3 from the leading edge of the receive timing interval (FIG. 10).

The mode selector switches the mode to any one of the different modes, i.e., the mode for selecting the IF signal corresponding to the portion occupying up to the point about ⅓ from the leading edge of the received reflected wave, the mode for selecting the IF signal corresponding to the portion occupying up to the point about ⅔ from the leading edge of the received reflected wave, or the mode for selecting the IF signal corresponding to the entire portion of the received reflected wave. Alternatively, the mode selector switches the mode sequentially through the above modes (FIG. 9).

The mode selector switches the mode to any one of the different modes, i.e., the mode for selecting the IF signal corresponding to the portion occupying up to the point about ⅓ from the leading edge of the received reflected wave, the mode for selecting the IF signal corresponding to the portion occupying from the point about ⅓ to the point about ⅔ from the leading edge of the received reflected wave, or the mode for selecting the IF signal corresponding to the portion occupying from the point about ⅔ to the point about ⅓ from the leading edge of the received reflected wave. Alternatively, the mode selector switches the mode sequentially through the above modes (FIG. 10).

The specific mode is any one of the modes consisting of the mode for selecting the IF signal corresponding to the portion occupying up to the point about ⅓ from the leading edge of the received reflected wave, the mode for selecting the IF signal corresponding to the portion occupying up to the point about ⅔ from the leading edge of the received reflected wave, and the mode for selecting the IF signal corresponding to the entire portion of the received reflected wave (FIG. 9).

Alternatively, the specific mode is any one of the modes consisting of the mode for selecting the IF signal corresponding to the portion occupying up to the point about ⅓ from the leading edge of the received reflected wave, the mode for selecting the IF signal corresponding to the portion occupying from the point about ⅓ to the point about ⅔ from the leading edge of the received reflected wave, and the mode for selecting an IF signal corresponding to a portion occupying from the point about ⅔ to the point about ⅓ from the leading edge of the received reflected wave (FIG. 10).

A transmit-receive FM-CW radar apparatus which switches between transmission and reception by time division control according to the present invention comprises: a mixer for downconverting an IF signal; a switch for turning on and off a local signal to be supplied to each of a plurality of mixers; and a switch controller for controlling the switch on and off in different modes and selecting the local signal in the different modes for supply to the mixer.

In one preferred mode of the invention, the radar apparatus comprises a plurality of mixers, each for downconverting the IF signal, and a plurality of switches one each provided for each of the plurality of mixers, and the switch controller controls the plurality of switches in different modes and selects the local signal in the different modes for supply to the plurality of mixers respectively (FIG. 11).

According to the transmit-receive FM-CW radar apparatus of the present invention, the mixer for downconverting the IF signal is a single mixer, and the switch for turning on and off the local signal is provided for the single mixer, wherein the radar apparatus includes a mode selector for controlling the switch on and off in different modes while selecting the on/off mode by switching between the different modes (FIG. 15).

According to the transmit-receive FM-CW radar apparatus of the present invention, the mixer for downconverting the IF signal is a single mixer, and the switch for turning on and off the local signal is provided for the single mixer, wherein the radar apparatus includes a mode controller for turning the switch on and off in a specific mode (FIG. 17).

The different modes consist of a short-range mode for downconverting an IF signal containing a signal from a short-range target, a mid-range mode for downconverting an IF signal containing a signal from a mid-range target, and a long-range mode for downconverting an IF signal containing a signal from a long-range target (FIGS. 9 and 10).

The mode selector switches the mode to any one of the different modes, i.e., the short-range mode, the mid-range mode, or the long-range mode. Alternatively, the mode selector switches the mode sequentially through the short-range mode, the mid-range mode, and the long-range mode (FIGS. 9 and 10).

The specific mode is any one of the modes consisting of the mode sequentially through the short-range mode, the mid-range mode, and the long-range mode (FIGS. 9 and 10).

The different modes consist of a mode for downconverting an IF signal corresponding to a portion occupying up to a point about ⅓ from the leading edge of a received reflected wave, a mode for downconverting an IF signal corresponding to a portion occupying up to a point about ⅔ from the leading edge of the received reflected wave, and a mode for downconverting an IF signal corresponding to an entire portion of the received reflected wave (FIG. 9).

Alternatively, the different modes consist of a mode for downconverting an IF signal corresponding to a portion occupying up to a point about ⅓ from the leading edge of a received reflected wave, a mode for downconverting an IF signal corresponding to a portion occupying from the point about ⅓ to the point about ⅔ from the leading edge of the received reflected wave, and a mode for downconverting an IF signal corresponding to a portion occupying from the point about ⅔ to the point about ⅓ from the leading edge of the received reflected wave (FIG. 10).

The mode selector switches the mode to any one of the different modes, i.e., the mode for downconverting the IF signal corresponding to the portion occupying up to the point about ⅓ from the leading edge of the received reflected wave, the mode for downconverting the IF signal corresponding to the portion occupying up to the point about ⅔ from the leading edge of the received reflected wave, or the mode for downconverting the IF signal corresponding to the entire portion of the received reflected wave. Alternatively, the mode selector switches the mode sequentially through the above modes (FIG. 9).

The mode selector switches the mode to any one of the different modes, i.e., the mode for downconverting the IF signal corresponding to the portion occupying up to the point about ⅓ from the leading edge of the received reflected wave, the mode for downconverting the IF signal corresponding to the portion occupying from the point about ⅓ to the point about ⅔ from the leading edge of the received reflected wave, or the mode for downconverting the IF signal corresponding to the portion occupying from the point about ⅔ to the point about ⅓ from the leading edge of the received reflected wave. Alternatively, the mode selector switches the mode sequentially through the above modes (FIG. 10).

The specific mode is any one of the modes consisting of the mode for downconverting the IF signal corresponding to the portion occupying up to the point about ⅓ from the leading edge of the received reflected wave, the mode for downconverting the IF signal corresponding to the portion occupying up to the point about ⅔ from the leading edge of the received reflected wave, and the mode for downconverting the IF signal corresponding to the entire portion of the received reflected wave (FIG. 9).

Alternatively, the specific mode is any one of the modes consisting of the mode for downconverting the IF signal corresponding to the portion occupying up to the point about ⅓ from the leading edge of the received reflected wave, the mode for downconverting the IF signal corresponding to the portion occupying from the point about ⅓ to the point about ⅔ from the leading edge of the received reflected wave, and the mode for downconverting the IF signal corresponding to the portion occupying from the point about ⅔ to the point about ⅓ from the leading edge of the received reflected wave (FIG. 10).

In the transmit-receive FM-CW radar according to the present invention, since the signals are processed separately according to the target range, such as the short range, mid range, and long range, FM-AM conversion noise can be reduced.

BRIEF DESCRIPTION OF THE DRAWINGS

The above object and features of the present invention will be more apparent from the following description of the preferred embodiments with reference to the accompanying drawings, wherein:

FIGS. 8A, 8B, 8C, and 8D are diagrams showing where in a reflected wave the signals from short-range, mid-range, and long-range targets, respectively, are contained;

FIGS. 9A, 9B, 9C, and 9D are diagrams showing the on/off operation of switches S1 to S3 for receiving the signals from the short-range, mid-range, and long-range targets, respectively;

FIGS. 10A, 10B, 10C, and 10D are diagrams showing the on/off operation of the switches S1 to S3 for receiving the signals from the short-range, mid-range, and long-range targets, respectively;

FIG. 11 is a diagram showing the configuration of a second embodiment of the present invention;

DESCRIPTION OF THE PREFERRED EMBODIMENTS

Before describing the radar apparatus of the present invention, the principle of FM-CW radar will be described.

An FM-CW radar measures the distance to a target object, such as a vehicle traveling ahead, by transmitting a continuous wave frequency-modulated, for example, in a triangular pattern. More specifically, the transmitted wave from the radar is reflected by the vehicle ahead, and the reflected signal is received and mixed with the transmitted signal to produce a beat signal (radar signal). This beat signal is fast Fourier transformed to analyze the frequency. The frequency-analyzed beat signal exhibits a peak at which power becomes large in correspondence with the target. The frequency corresponding to this peak is called the peak frequency. The peak frequency carries information about distance, and the peak frequency differs between the rising portion and falling portion of the triangular FM-CW wave due to the Doppler effect associated with the relative velocity with respect to the vehicle ahead. The distance and the relative velocity with respect to the vehicle ahead can be obtained from the peak frequencies in the rising and falling portions. If there is more than one vehicle traveling ahead, a pair of peak frequencies in the rising and falling portions is generated for each vehicle. Forming pairs of peak frequencies in the rising and falling portions is called pairing.

Figure 1A:
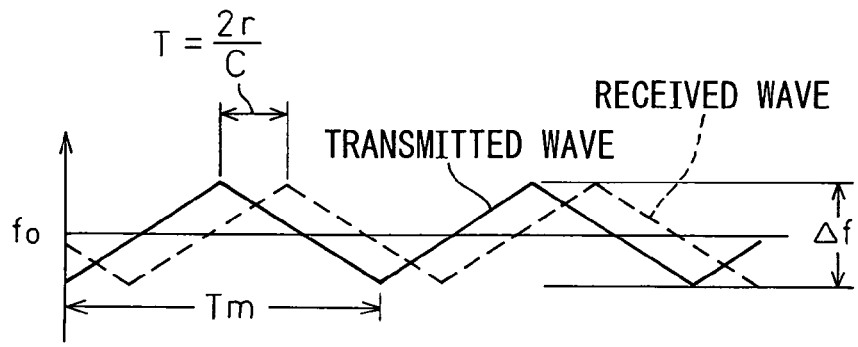
FIGS. 1A, 1B, and 1C are diagrams for explaining the principle of FM-CW radar when the relative velocity with respect to target is 0.
Figure 1B:
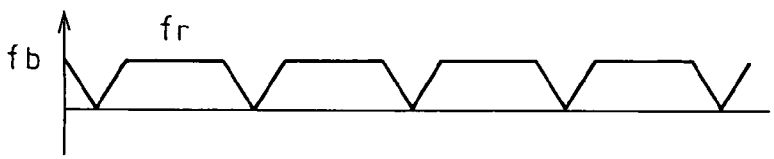
Figure 1C:
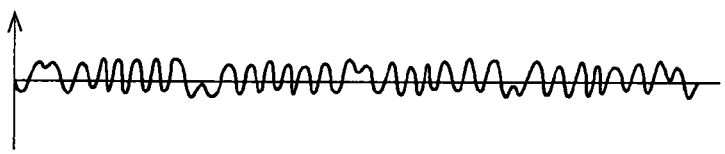

FIGS. 1A to 1C are diagrams for explaining the principle of the FM-CW radar when the relative velocity with respect to the target is 0. The transmitted wave is a triangular wave whose frequency changes as shown by a solid line in FIG. 1A. In the figure, f0 is the center frequency of the transmitted wave, $\Delta f$ is the FM modulation width, and Tm is the repetition period. The transmitted wave is reflected from the target and received by an antenna; the received wave is shown by a dashed line in FIG. 1A. The round trip time T to and from the target is given by T=2r/C, where r is the distance (range) to the target and C is the velocity of radio wave propagation.

Here, the received wave is shifted in frequency from the transmitted signal (i.e., produces a beat) according to the distance between the radar and the target.

The frequency component fb of the beat signal can be expressed by the following equation.

$$fb = fr = (4 \cdot \Delta f / C \cdot Tm) r \quad (1)$$

where fr is the frequency due to the range (distance).

Figure 2A:
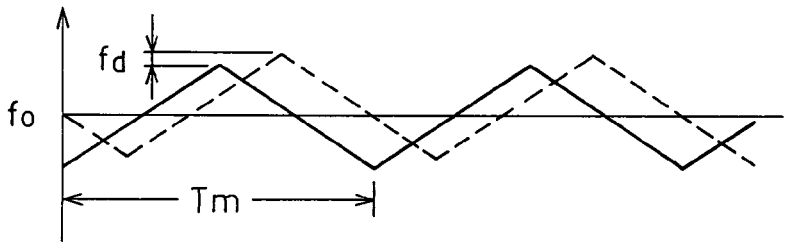
FIGS. 2A, 2B, and 2C are diagrams for explaining the principle of FM-CW radar when the relative velocity with respect to target is v.
Figure 2B:
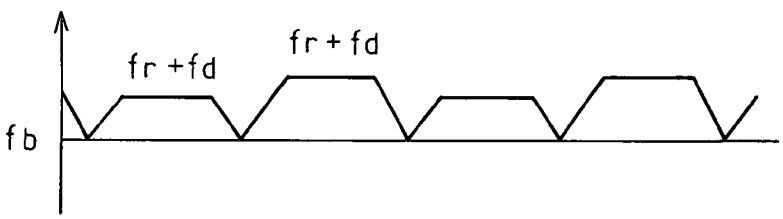
Figure 2C:
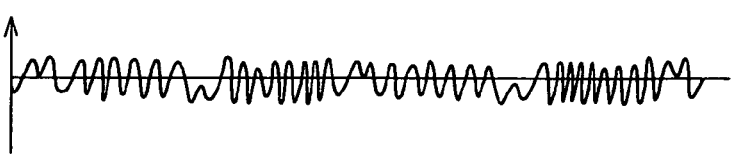

FIGS. 2A to 2C, on the other hand, are diagrams for explaining the principle of the FM-CW radar when the relative velocity with respect to the target is v. The frequency of the transmitted wave changes as shown by a solid line in FIG. 2A. The transmitted wave is reflected from the target and received by the antenna; the received wave is shown by a dashed line in FIG. 2A. Here, the received wave is shifted in frequency from the transmitted signal (i.e., produces a beat) according to the distance between the radar and the target.

In this case, since the relative velocity with respect to the target is v, a Doppler shift occurs, and the beat frequency component fb can be expressed by the following equation.

$$fb = fr \pm fd = (4 \cdot \Delta f / C \cdot Tm) r \pm (2 \cdot f0 / C) v \quad (2)$$

where fr is the frequency due to the distance, and fd is the frequency due to the velocity.

Figure 3:
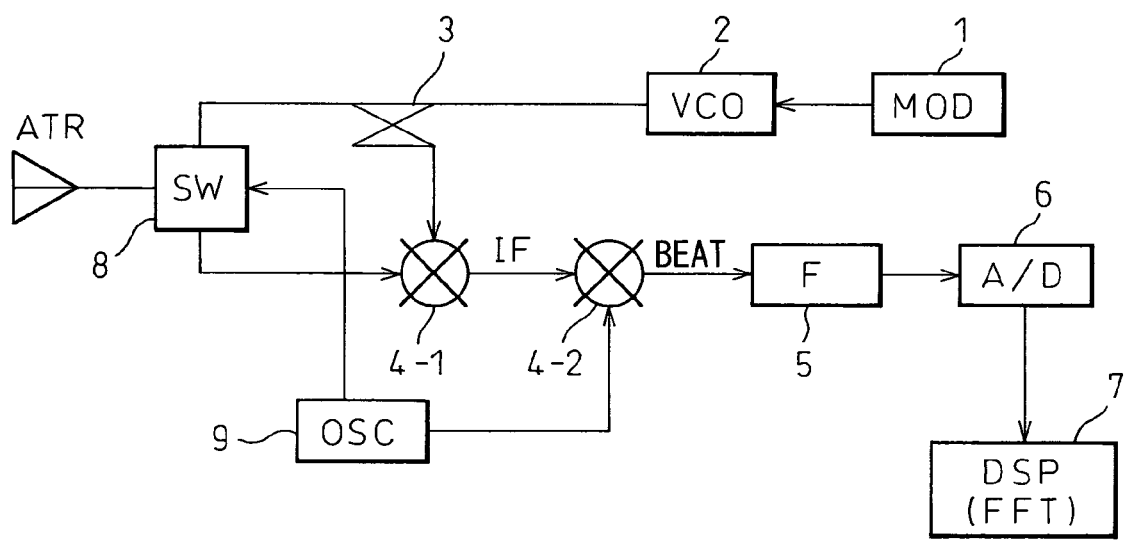
FIG. 3 is a diagram showing one configuration example of a single-antenna transmit-receive FM-CW radar.

The symbols in the above equation have the following meanings.

fb: Transmit beat frequency
fr: Range (distance) frequency
fd: Velocity frequency
f0: Center frequency of transmitted wave
$\Delta f$: Frequency modulation width
Tm: Period of modulation wave
C: Velocity of light (velocity of radio wave)
T: Round trip time of radio wave to and from target object
r: Range (distance) to target object v: Relative velocity with respect to target object FIG. 3 is a diagram showing one configuration example of a single-antenna transmit-receive FM-CW radar. As shown, a modulating signal generator (MOD) 1 applies a modulating signal to a voltage-controlled oscillator (VCO) 2 for frequency modulation, and the frequency-modulated wave is passed through a directional coupler 3 and transmitted out from a transmitting/receiving antenna (ATR), while a portion of the transmitted signal is separated by the directional coupler 3 and fed into a first mixer 4-1. The signal reflected from a target is received by the transmitting/receiving antenna (ART). SW8 is a transmit-receive switch which switches the antenna between transmission and reception in accordance with a signal supplied from a transmit-receive switching signal generator (OSC) 9 constructed from an oscillator. The OSC 9 generates a modulating signal of frequency $f_{sw}$ for causing the SW 8 to switch the antenna between transmission and reception. The received signal is mixed in the first mixer 4-1 with the output signal of the voltage-controlled oscillator (VCO) 2 to produce an IF signal. The IF signal is mixed in a second mixer 4-2 with the modulating signal of frequency $f_{sw}$ supplied from the OSC 9 and is thus downconverted, producing a beat signal. The beat signal is passed through a filter (F) 5, and is converted by an A/D converter (A/D) 6 into a digital signal; the digital signal is then supplied to a digital signal processor (DSP) 7 where signal processing such as fast Fourier transform is applied to the digital signal to obtain distance, relative velocity, etc.

The power of the received signal received via the transmitting/receiving antenna and the power of the beat signal are as shown below. First, the power of the received signal, Pr, is expressed by the following equation.

$$Pr=\{(G^2 \cdot \lambda^2 \cdot \sigma \cdot Pt)/((4\pi)^3 \cdot r^4)\} \cdot La \qquad (3)$$

The symbols in the above equation have the following meanings.

G: Antenna gain
λ: Wavelength
σ: Cross-sectional area of reflecting object
Pt: Transmitter power
r: Range
La: Atmospheric attenuation factor The power of the beat signal, Pb, is expressed by the following equation.

$$Pb=Pr \cdot Cmix \qquad (4)$$

where Cmix is the conversion loss factor in the mixer.

Figure 4A:
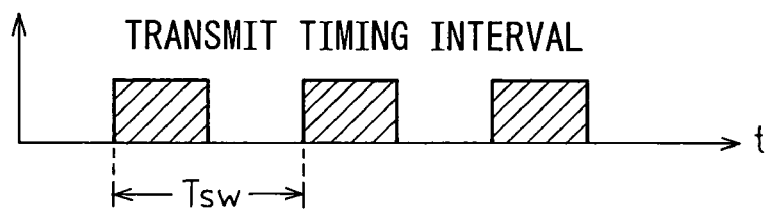
FIGS. 4A, 4B, 4C, and 4D are diagrams showing timings for transmission, reception, etc.
Figure 4B:
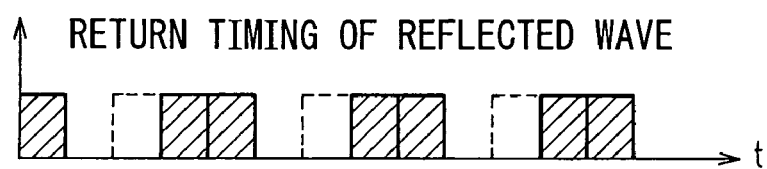
Figure 4C:
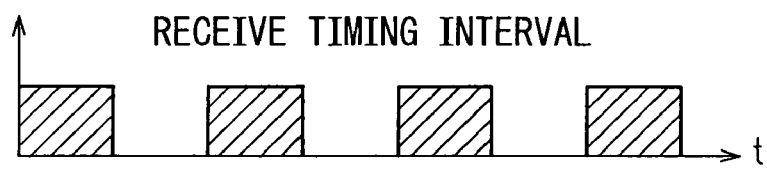
Figure 4D:
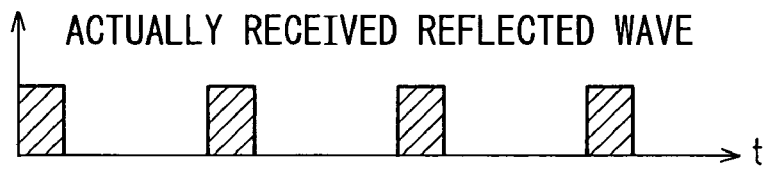

FIGS. 4A to 4D are diagrams showing timings for transmission, reception, etc. The SW 8 in FIG. 3 is switched by the signal of frequency $f_{sw}$ (period $T_{sw}$) to switch the timing between transmission and reception. FIG. 4A shows the transmit timing interval, and FIG. 4B shows the return timing of the transmitted wave reflected from a target. FIG. 4C shows the receive timing interval; the reflected wave returned during this interval is received by the antenna ATR and fed into the mixer. Accordingly, when the reflected wave is returned at the timing shown in FIG. 4B, the actually received reflected wave is as shown in FIG. 4D.

As described above, in the single-antenna transmit-receive FM-CW radar, the transmit and receive timings are provided one alternating with the other, and the reflected wave, i.e., the transmitted wave returned upon reflection from the target, is received. Further, since the receive timing interval is one half the cycle period $T_{sw}$ of the transmit-receive switching frequency, the receiving efficiency is maximized when the delay time of the reflected wave is one half the cycle period; on the other hand, if the delay time is one cycle period, the reflected wave cannot be received.

Accordingly, to secure the desired detection range, the transmit-receive switching frequency must be selected so that the delay time of the reflected wave returned from the desired detection range will be less than one cycle period of the transmit-receive switching frequency. In this case, if a target at longer range is also to be detected, a lower transmit-receive switching frequency is selected.

On the other hand, in the single-antenna transmit-receive FM-CW radar, noise occurs during FM-AM conversion, and this degrades the S/N ratio. The principle of why noise occurs during the conversion will be described below with reference to FIG. 5 and FIGS. 6A to 6E.

Figure 5:
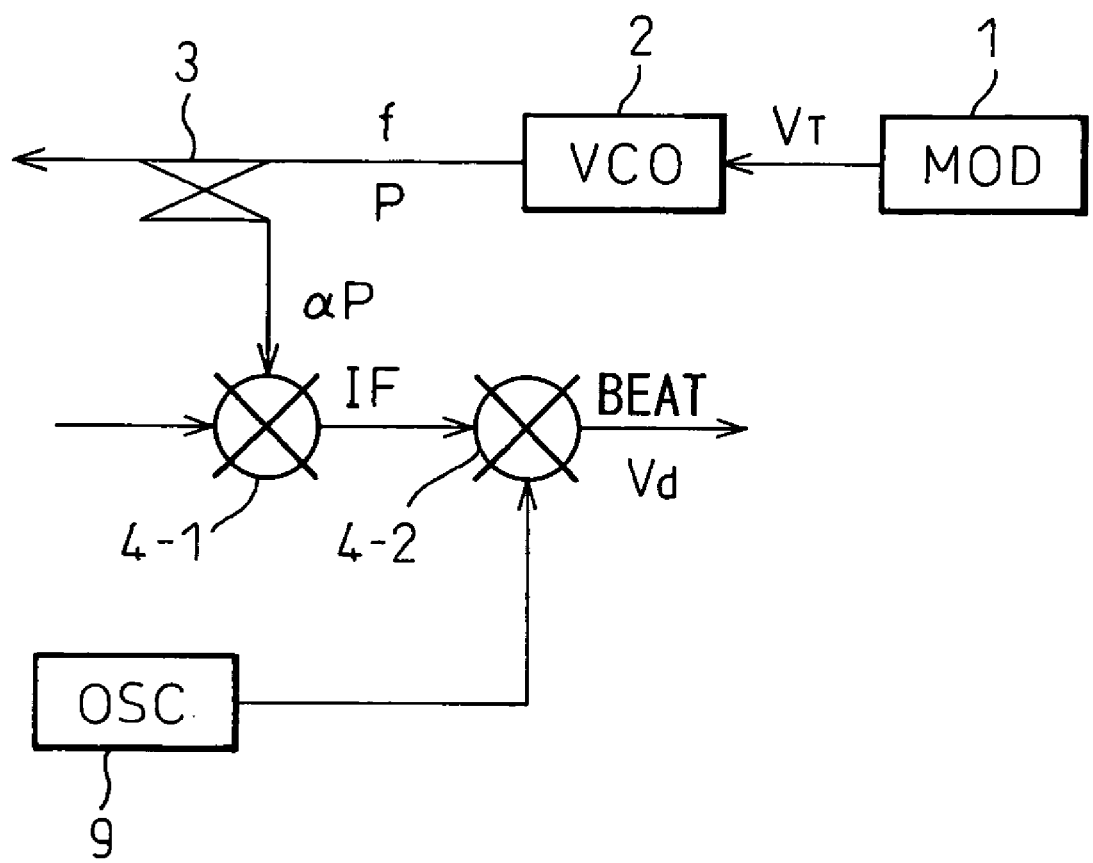
FIG. 5 is a diagram showing a portion of the configuration of the single-antenna transmit-receive FM-CW radar shown in FIG. 3.

FIG. 5 is a diagram showing a portion of the configuration of the single-antenna transmit-receive FM-CW radar shown in FIG. 3. As shown in FIG. 5, the modulating signal generator (MOD) 1 applies a modulating signal VT to the voltage-controlled oscillator (VCO) 2 for frequency modulation. A transmitted signal of frequency f and output power P is output from the VCO 2, and a portion αP (α<1) of the transmitted signal is separated by the directional coupler 3 and fed into the first mixer 4-1. On the other hand, the received signal is mixed in the first mixer 4-1 with the output signal of the voltage-controlled oscillator (VCO) 2 to produce the IF signal. The IF signal is mixed in the second mixer 4-2 with the modulating signal of frequency $f_{sw}$ supplied from the OSC 9 and is thus downconverted, producing a beat signal of voltage Vd.

Figure 6A:
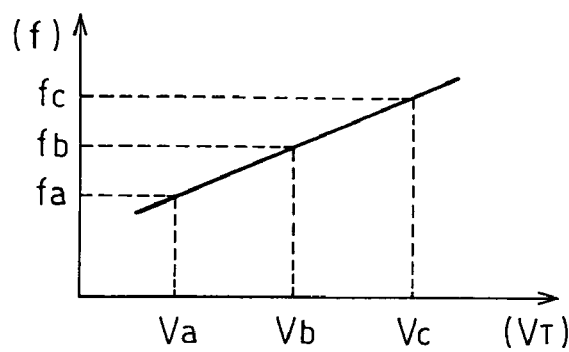
FIGS. 6A, 6B, 6C, 6D, and 6E are diagrams for explaining the relationships of a modulating signal VT to an output frequency f and power P from a modulating signal generator and an output voltage Vd from a mixer.
Figure 6B:
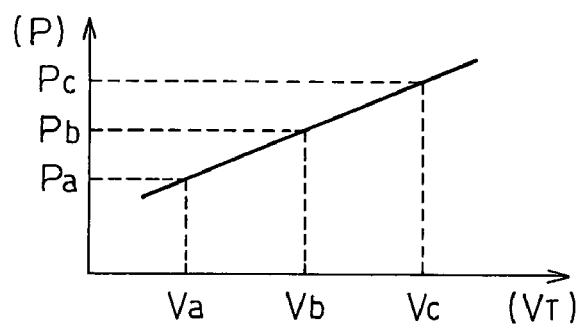

FIGS. 6A to 6E are diagrams for explaining the relationships of the modulating signal VT to the output frequency f and power P from the VCO 2 and the voltage Vd of the beat signal output from the second mixer 4-2. FIG. 6A is a graph showing the relationship between VT and f. As VT changes from Va to Vb and to Vc, f changes from fa to fb and to fc. Here, even when VT changes, P should not change but remain constant, but actually, P also changes as shown in FIG. 6B.

Figure 6C:
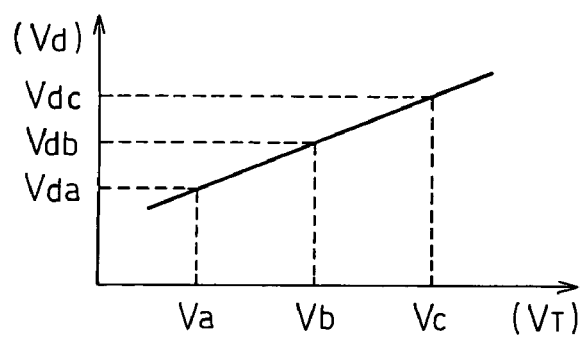
Figure 6D:
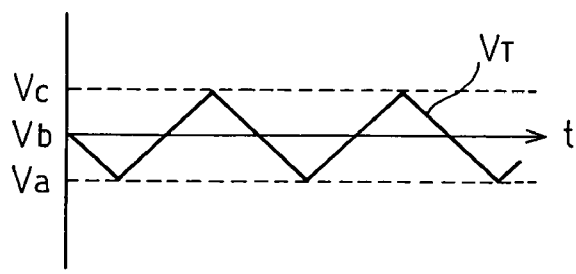
Figure 6E:
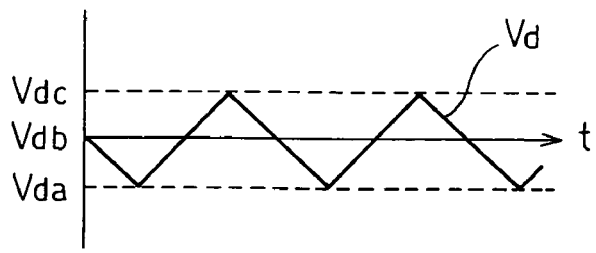

As for Vd, if P remained constant irrespective of the change of VT, Vd would also remain constant, but as it is, Vd also changes as shown in FIG. 6C, because P changes. As a result, when the voltage VT applied to the VCO 2 changes as shown in FIG. 6D, the voltage Vd of the beat signal output from the second mixer 4-2 also changes as shown in FIG. 6E. This change causes FM-AM conversion noise, which is introduced into the mixer output, resulting in a degradation of the S/N ratio.

The present invention aims to reduce the FM-AM conversion noise and to improve the S/N ratio. Embodiments of the present invention will be described below.

EMBODIMENT 1

Figure 7:
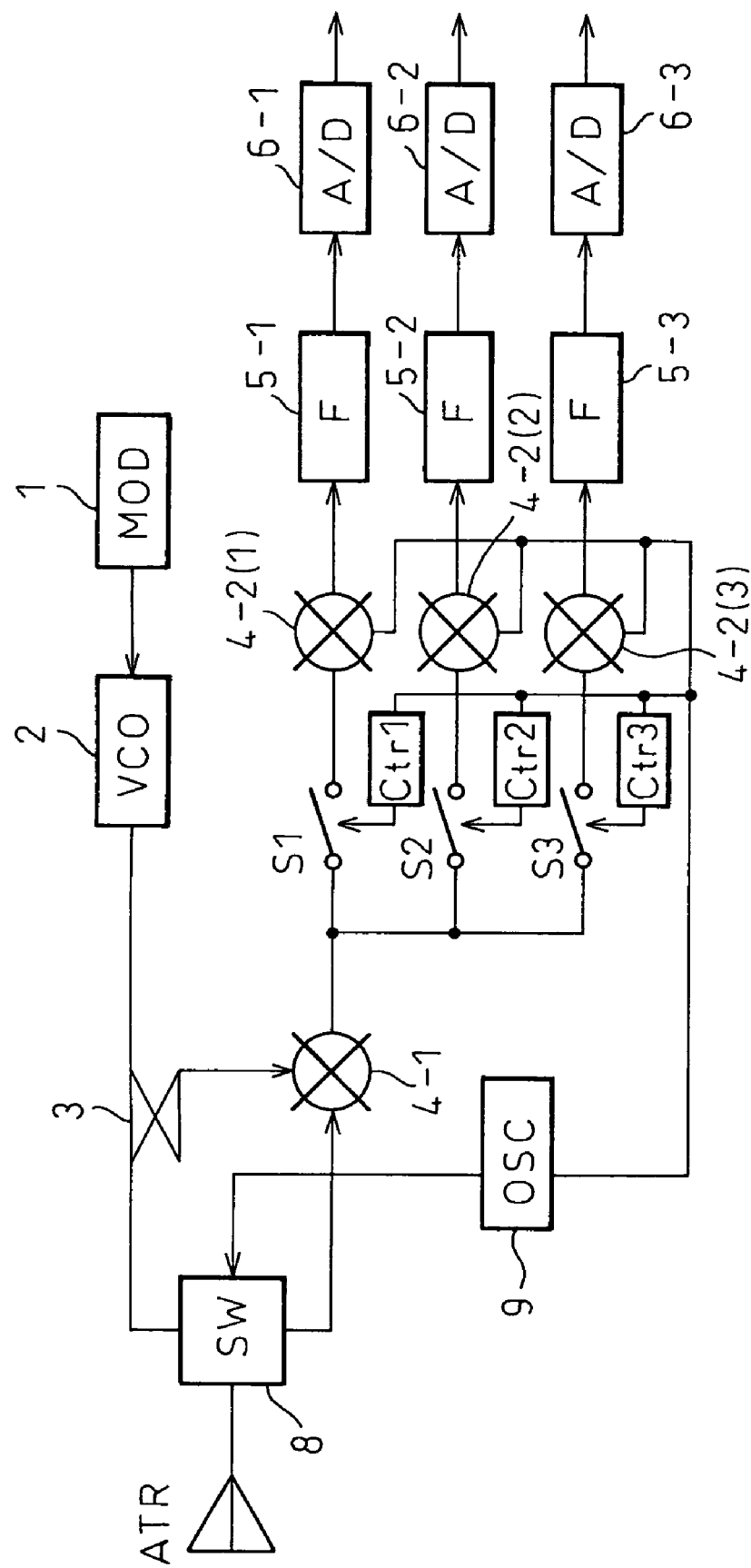
FIG. 7 is a diagram showing the configuration of a first embodiment of the present invention.

FIG. 7 is a diagram showing the configuration of a transmit-receive FM-CW radar according to a first embodiment of the present invention. The configuration of this embodiment differs from the configuration shown in FIG. 3 by the inclusion of a plurality of switches S1 to S3 and a corresponding plurality of second mixers 4-2(1) to 4-2(3), filters 5-1 to 5-3, and A/D converters 6-1 to 6-3. In this embodiment, the switches S1 to S3 are provided with switch controllers Ctr1 to Ctr3, respectively, and are controlled on and off in respectively different modes. Accordingly, the IF signal output from the first mixer 4-1 is selected in the respectively different modes, and the IF signal thus selected is supplied to the corresponding one of the plurality of second mixers 4-2(1) to 4-2(3), where the IF signal is mixed with the modulating signal from the OSC 9 and is thus downconverted, producing a beat signal. The produced beat signal is individually processed in the corresponding one of the filters 5-1 to 5-3 and the corresponding one of the A/D converters 6-1 to 6-3.

The shorter the target range, the earlier the reflected wave returns. FIGS. 8A to 8D are diagrams showing which portion of the reflected wave is received according to the target range.

FIG. 8D is a diagram showing the receive timing interval (the same as that shown in FIG. 4C), and FIG. 8A is a diagram showing the return timing of the reflected wave from a short-range target. As can be seen from the waveform shown in FIG. 8A, the reflected wave from the short-range target returns during the interval $t_a$ to $t_1$ which is earlier than the receive timing interval $t_0$ to $t_3$. Here, since the portion $t_a$ to $t_0$ of the reflected wave returns earlier than the receive timing interval $t_0$ to $t_3$, this portion is not received and, of the reflected wave from the short-range target, only the portion $t_0$ to $t_1$ is actually received.

Likewise, FIG. 8B is a diagram showing the return timing of the reflected wave from a mid-range target. In this case, as can be seen from the waveform shown in FIG. 8B, since the reflected wave returns during the interval $t_b$ to $t_2$ which is earlier than the receive timing interval, only the portion $t_0$ to $t_2$ is actually received.

FIG. 8C is a diagram showing the return timing of the reflected wave from a long-range target. In this case, since the reflected wave returns during the interval that substantially coincides with the receive timing interval, most of the reflected wave is received.

Here, the short range refers to a distance of about 50 m or less and the mid range to a distance about 50 m to 100 m, while the long range refers to a distance longer than about 100 m. However, these are only examples, and the ranges need not necessarily be limited to these distances.

The signal from the short-range target is contained in the portion of the reflected wave shown in FIG. 8A, the signal from the mid-range target is contained in the portion of the reflected wave shown in FIG. 8B, and the signal from the long-range target is contained in the portion of the reflected wave shown in FIG. 8C.

In view of this, in the present invention, the switches S1 to S3 are turned on and off in respectively different modes to select the IF signal in the respectively different modes, and the signals from the short-range, mid-range, and long-range targets are supplied to the respective mixers 4-2(1) to 4-2(3) and processed separately from each other, thereby reducing FM-AM reconversion noise and thus improving the S/N ratio.

FIGS. 9A to 9D are diagrams showing the on/off operation of S1 to S3. Since S1 selects the IF signal containing the signal from the short-range target, S1 is turned on only for the duration of the interval $t_0$ to $t_1$ so as to select the IF signal corresponding to the portion occupying up to the point about ⅓ from the leading edge of the received reflected wave, and supplies the IF signal only for that portion to the second mixer 4-2(1) (short-range mode). Since S2 selects the IF signal containing the signal from the mid-range target, S2 is turned on only for the duration of the interval $t_0$ to $t_2$ so as to select the IF signal corresponding to the portion occupying up to the point about ⅔ from the leading edge of the received reflected wave, and supplies the IF signal only for that portion to the second mixer 4-2(2) (mid-range mode). Since S3 selects the IF signal containing the signal from the long-range target, S3 is turned on only for the duration of the interval $t_0$ to $t_3$ so as to select the IF signal corresponding to the entire portion of the received reflected wave, and supplies the IF signal only for that portion to the second mixer 4-2(3) (long-range mode). Here, the interval $t_0$ to $t_3$ coincides with the receive timing interval shown in FIG. 9D (refer to FIG. 4C for the receive timing interval).

The switch controllers Ctr1 to Ctr3 perform the on/off control of the respective switches S1 to S3 in the respectively different modes, based on the signal of frequency $f_{sw}$ supplied from the OSC 9.

As described above, since the signal contained in the reflected wave is selectively supplied according to the target range, the FM-AM conversion noise can be reduced and the S/N ratio improved, compared with the case where all the reflected wave incident during the receive timing interval is supplied.

The above description has dealt with the case where three switches are provided, but the number of switches may be varied according to the range. For example, two switches, one for the short-range mode and the other for the long-range mode, may be provided, or the modes from the short-range to the long-range may be divided into four or more modes. Further, the reflected wave to be selected has been divided into three portions, but this is just one example; the only requirement here is that the reflected wave be divided so that the signals from the short-range, mid-range, and long-range targets, for example, can be individually selected.

As shown in FIG. 7, the signal separated by the directional coupler 3 for application to the first mixer 4-1 is being output at all times irrespective of the receive timing interval. However, in the present invention, only the selected signal is supplied to the corresponding second mixer 4-2 for processing and, as shown in FIG. 9C, the signal is selected for the duration of the interval $t_0$ to $t_3$ at the longest; since the transmitted signal from the coupler, which contains FM-AM conversion noise, is not supplied for the duration of the interval $T_0$, the noise is reduced correspondingly.

FIGS. 10A to 10D are diagrams showing a modified example of the ON/OFF operation of S1 to S3 shown in FIGS. 9A to 9D. Since S1 selects the IF signal containing the signal from the short-range target, S1 is turned on only for the duration of the interval $t_0$ to $t_1$ (FIG. 10A) so as to select the IF signal corresponding to the portion occupying up to the point about ⅓ from the leading edge of the received reflected wave, and supplies the IF signal only for that portion to the second mixer 4-2(1) (short-range mode). Since S2 selects the IF signal containing the signal from the mid-range target, S2 is turned on only for the duration of the interval $t_1$ to $t_2$ (FIG. 10B) so as to select the IF signal corresponding to the portion occupying from the point about ⅓ to the point about ⅔ from the leading edge of the received reflected wave, and supplies the IF signal only for that portion to the second mixer 4-2(2) (mid-range mode). Since S3 selects the IF signal containing the signal from the long-range target, S3 is turned on only for the duration of the interval $t_2$ to $t_3$ (FIG. 10C) so as to select the IF signal corresponding to the portion occupying from the point about ⅔ to the point about ⅓ from the leading edge of the received reflected wave, and supplies the IF signal only for that portion to the second mixer 4-2(3) (long-range mode). FIG. 10D is a diagram showing the receive timing interval.

EMBODIMENT 2

FIG. 11 is a diagram showing the configuration of a transmit-receive FM-CW radar according to a second embodiment of the present invention. The configuration is the same as that shown in FIG. 7 in that the plurality of second mixers 4-2(1) to 4-2(3), filters 5-1 to 5-3, and A/D converters 6-1 to 6-3 are provided. However, this embodiment differs in that the plurality of second mixers 4-2(1) to 4-2(3) downconvert the IF signal by using respectively different local signals and thus select the respective range signal components to be extracted from the IF signal, so that the signals from the short-range, mid-range, and long-range targets are separately processed in the DSP.

S1 to S3 are connected between the OSC 9 and the respective second mixers 4-2(1) to 4-2(3), and are controlled on and off in respectively different modes by the respective controllers Ctr1 to Ctr3. When S1 to S3 are respectively turned on, the respective second mixers 4-2(1) to 4-2(3) downconvert the IF signal. Since S1 to S3 are controlled on and off in respectively different modes by the respective controllers Ctr1 to Ctr3, the respective second mixers 4-2(1) to 4-2(3) downconvert the IF signal by using the local signals of different modes. The controllers Ctr1 to Ctr3 control the on/off operations of the respective switches S1 to S3 based on the signal of frequency $f_{sw}$ supplied from the OSC 9.

The on/off timings of S1 to S3 in FIG. 11 are the same as those shown in FIGS. 9A to 9C. As shown in FIG. 9A, for the mixer 4-2(1) to downconvert the IF signal containing the signal from the short-range target, S1 is turned on only for the duration of the interval $t_0$ to $t_1$ (FIG. 9A) so as to generate a local signal with a duty ratio corresponding to the portion occupying up to the point about ⅓ from the leading edge of the receiving interval (short-range mode). For the mixer 4-2(2) to downconvert the IF signal containing the signal from the mid-range target, S2 is turned on only for the duration of the interval $t_0$ to $t_2$ (FIG. 9B) so as to generate a local signal with a duty ratio corresponding to the portion occupying up to the point about ⅔ from the leading edge of the receiving interval (mid-range mode). For the mixer 4-2(3) to downconvert the IF signal containing the signal from the long-range target, S3 is turned on for the duration of the receive timing interval $t_0$ to $t_3$ (FIG. 9C) so as to generate a local signal with a duty ratio corresponding to the entire portion of the receiving interval (long-range mode).

The on/off timings of S1 to S3 in FIG. 11 may be made the same as those shown in FIGS. 10A to 10C. As shown in FIG. 10A, for the mixer 4-2(1) to downconvert the IF signal containing the signal from the short-range target, S1 is turned on only for the duration of the interval $t_0$ to $t_1$ so as to generate a local signal with a duty ratio and phase corresponding to the portion occupying up to the point about ⅓ from the leading edge of the receiving interval (short-range mode). For the mixer 4-2(2) to downconvert the IF signal containing the signal from the mid-range target, S2 is turned on only for the duration of the interval $t_1$ to $t_2$ (FIG. 10B) so as to generate a local signal with a duty ratio and phase corresponding to the portion occupying from the point about ⅓ to the point about ⅔ from the leading edge of the receiving interval (mid-range mode). For the mixer 4-2(3) to downconvert the IF signal containing the signal from the long-range target, S3 is turned on for the duration of the interval $t_2$ to $t_3$ (FIG. 10C) so as to generate a local signal with a duty ratio and phase corresponding to the portion occupying from the point about ⅔ to the point about ⅓ from the leading edge of the receiving interval (long-range mode). FIG. 10D shows the receive timing interval.

The duty ratios shown in FIGS. 10A to 10D are all identical, but differ only in phase.

EMBODIMENT 3

Figure 12:
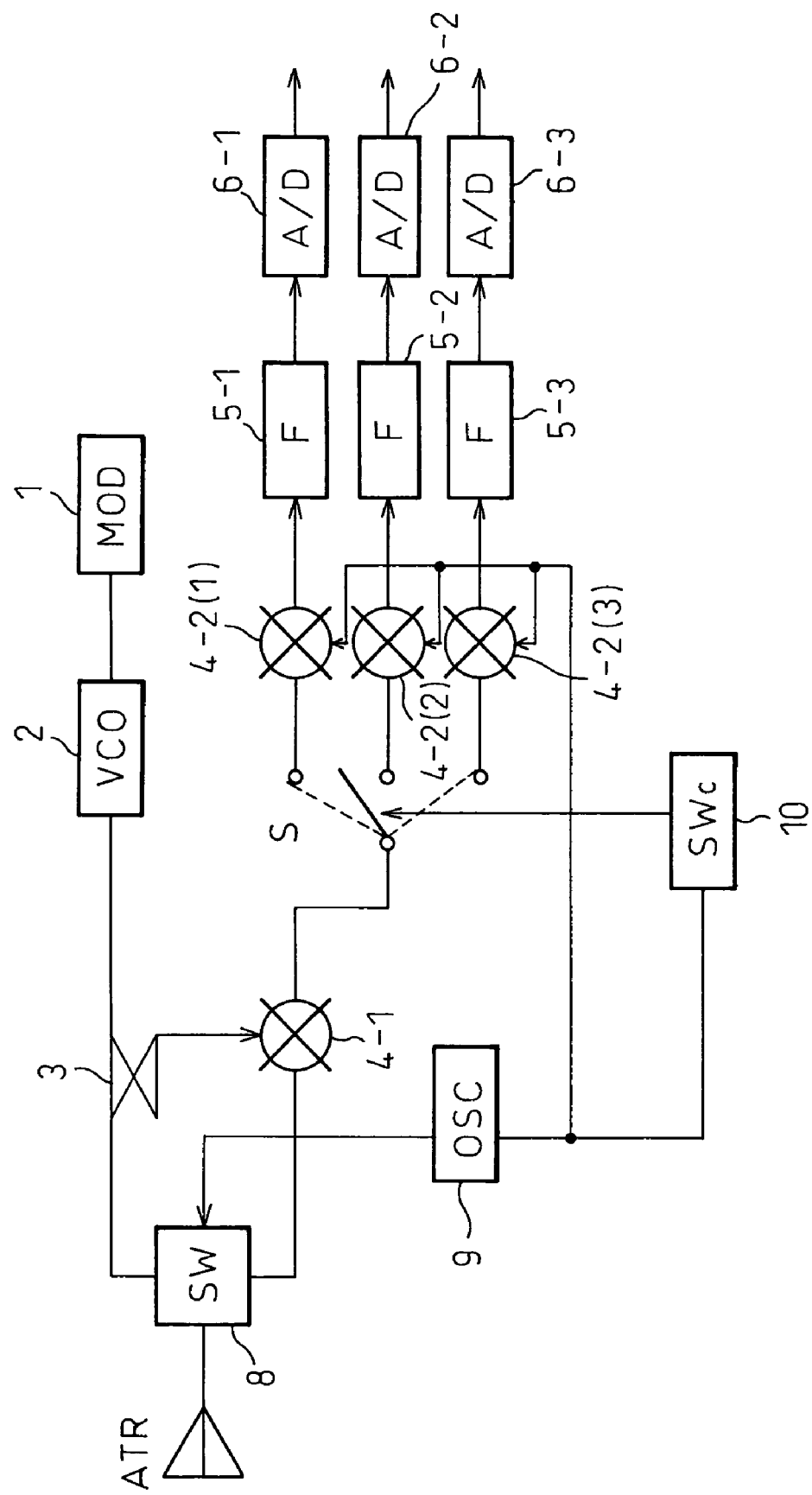
FIG. 12 is a diagram showing the configuration of a third embodiment of the present invention.

FIG. 12 is a diagram showing the configuration of a transmit-receive FM-CW radar according to a third embodiment of the present invention. The configuration is the same as that shown in FIG. 7 in that the plurality of second mixers 4-2(1) to 4-2(3), filters 5-1 to 5-3, and A/D converters 6-1 to 6-3 are provided. In this embodiment, a selector switch S is provided which is switched for connection to one of the plurality of second mixers 4-2(1) to 4-2(3). Here, by controlling the timing with which the selector switch is connected to the respective second mixers 4-2(1) to 4-2(3), the IF signal is selected in respectively different modes and supplied to the respective second mixers 4-2(1) to 4-2(3).

Figures 13A, 13B:
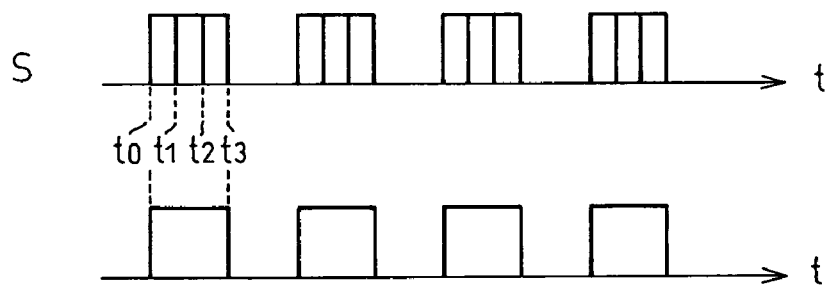
FIGS. 13A and 13B are diagrams for explaining the switching timing of a switch S shown in FIG. 12.

FIGS. 13A and 13B are diagrams for explaining the switching timing of the switch S shown in FIG. 12. The switching of the selector switch S is controlled by a switching controller (SWc) 10, that is, the SWc 10 controls the switching timing of the switch S based on the modulating signal of frequency $f_{sw}$ supplied from the OSC 9.

FIG. 13B shows the receive timing interval, while FIG. 13A shows the switching timing of the switch S. The switch S connects to the mixer 4-2(1) only for the duration of the interval $t_0$ to $t_1$, the portion occupying up to the point about ⅓ from the leading edge of the receive timing interval, so that the IF signal containing the signal from the short-range target is selected and downconverted. Next, the switch S connects to the mixer 4-2(2) only for the duration of the interval $t_1$ to $t_2$, the portion occupying from the point about ⅓ to the point about ⅔ from the leading edge of the receive timing interval, so that the IF signal containing the signal from the mid-range target is selected and downconverted. Finally, the switch S connects to the mixer 4-2(3) only for the duration of the interval $t_2$ to $t_3$, the portion occupying from the point about ⅔ to the point about ⅓ from the leading edge of the receive timing interval, so that the IF signal containing the signal from the long-range target is selected and downconverted.

EMBODIMENT 4

Figure 14:
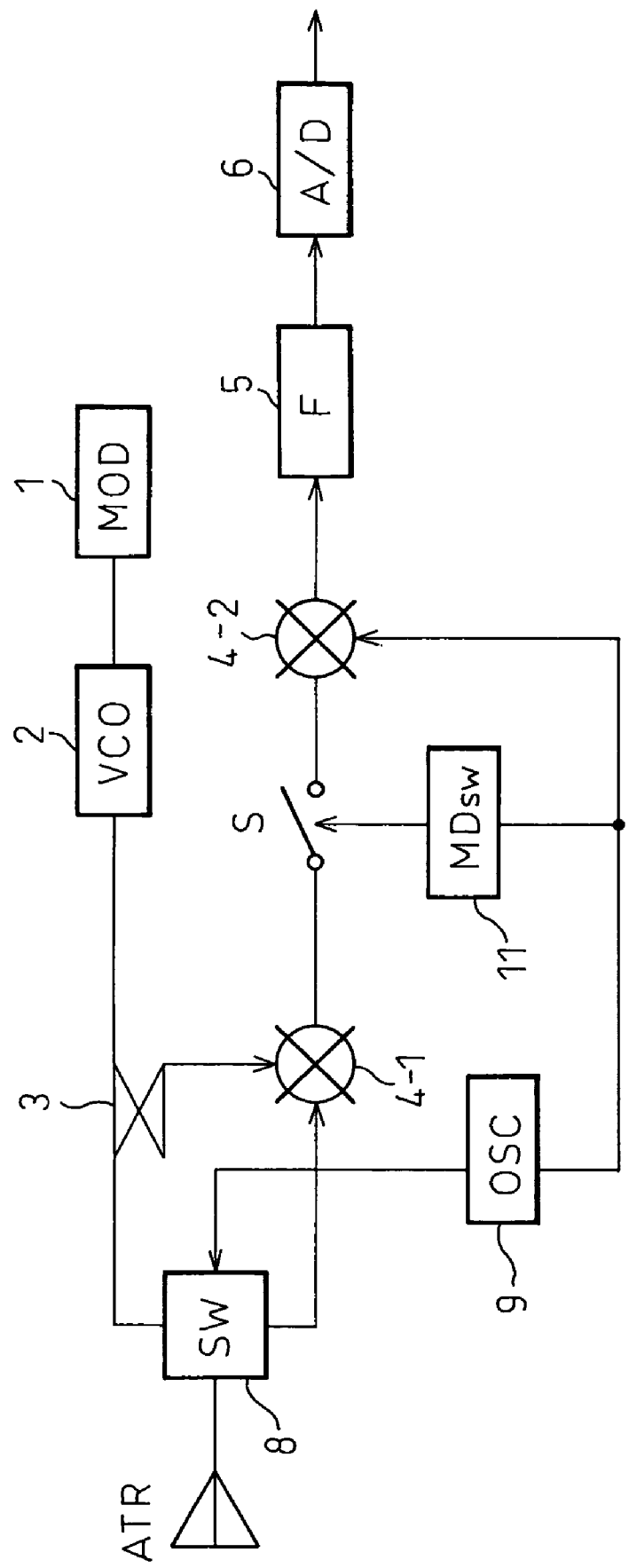
FIG. 14 is a diagram showing the configuration of a fourth embodiment of the present invention.

FIG. 14 is a diagram showing the configuration of a transmit-receive FM-CW radar according to a fourth embodiment of the present invention. In this embodiment, a mode selector (MDsw) 11 is provided, and the on/off operation of the switch S is controlled in accordance with the mode selected by the switching of the MDsw 11.

In this embodiment, the on/off timing of the switch S is varied in accordance with the mode selected by the switching of the MDsw 11, for example, the short-range mode, the mid-range mode, or the long-range mode.

The on/off timings in the respective modes are the same as those shown in FIGS. 9A to 9C. The MDsw 11 performs the control based on the modulating signal of frequency $f_{sw}$ supplied from the OSC 9.

The mode switching can be performed based on the target range. For example, if the target is at short range, the mode is switched to the short-range mode. Alternatively, the mode may be switched cyclically through the short-range mode, the mid-range mode, and the long-range mode in this order.

The on/off operation of the switch S in the respective mode may be performed in accordance with the on/off timings shown in FIGS. 10A to 10C.

EMBODIMENT 5

Figure 15:
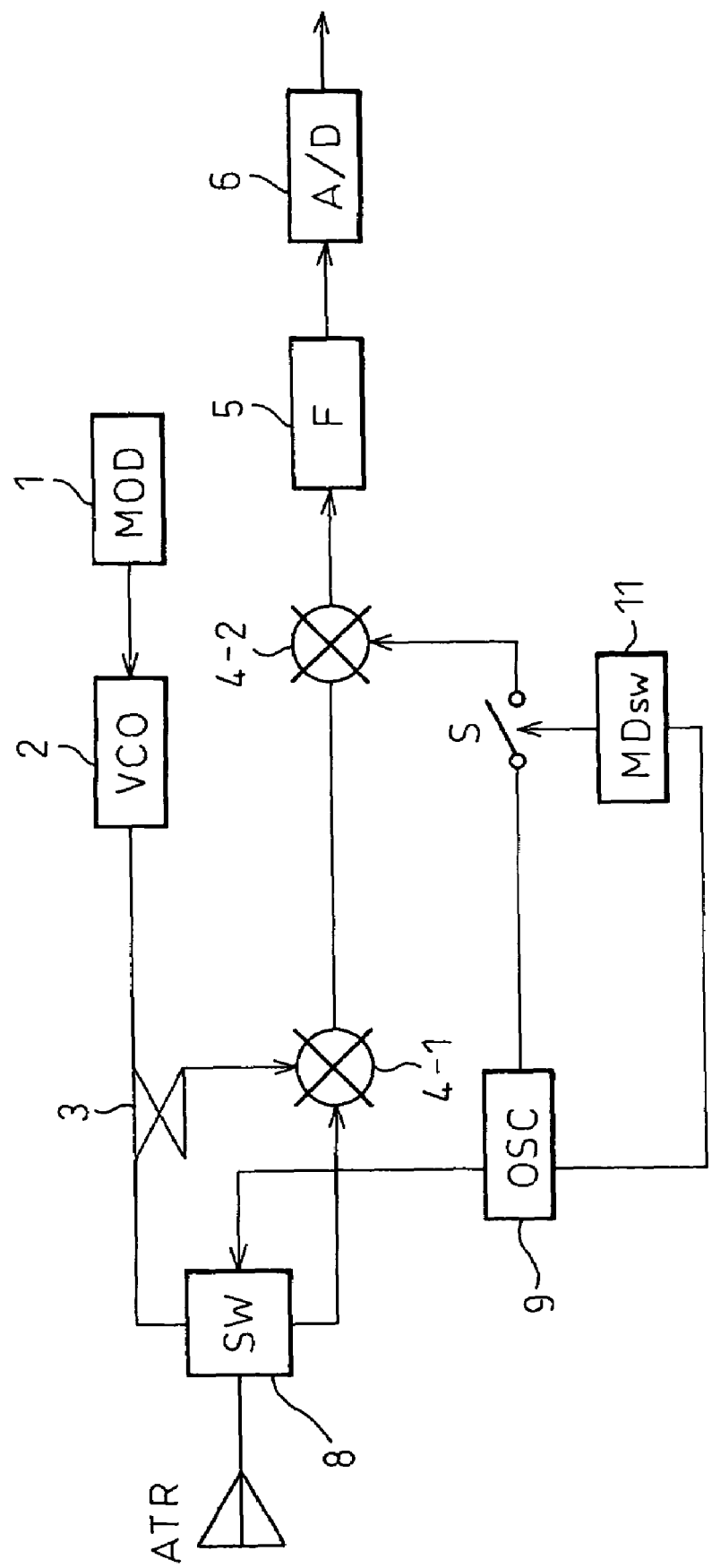
FIG. 15 is a diagram showing the configuration of a fifth embodiment of the present invention.

FIG. 15 is a diagram showing the configuration of a transmit-receive FM-CW radar according to a fifth embodiment of the present invention. In this embodiment, a mode selector (MDsw) 11 is provided, and the on/off operation of the switch S is controlled in accordance with the mode selected by the switching of the MDsw 11, thereby controlling the local signal with which the second mixer 4-2 downconverts the IF signal.

In this embodiment, the local signal with which the second mixer 4-2 downconverts the IF signal is controlled by turning the switch S on and off based on the mode selected by the switching of the MDsw 11, thereby selecting the range signal to be extracted from the IF signal which is to be downconverted, and the signals from the short-range, mid-range, and long-range targets are processed separately.

The mode switching can be performed based on the target range. For example, if the target is at short range, the mode is switched to the short-range mode. Alternatively, the mode may be switched cyclically through the short-range mode, the mid-range mode, and the long-range mode in this order.

The MDsw 11 controls the switch S based on the signal of frequency $f_{sw}$ supplied from the OSC 9.

The on/off timings of the switch S are the same as those employed in the fourth embodiment. That is, the on/off operation of the switch S is performed in accordance with the on/off timings shown in FIGS. 9A to 9C or FIGS. 10A to 10C.

EMBODIMENT 6

Figure 16:
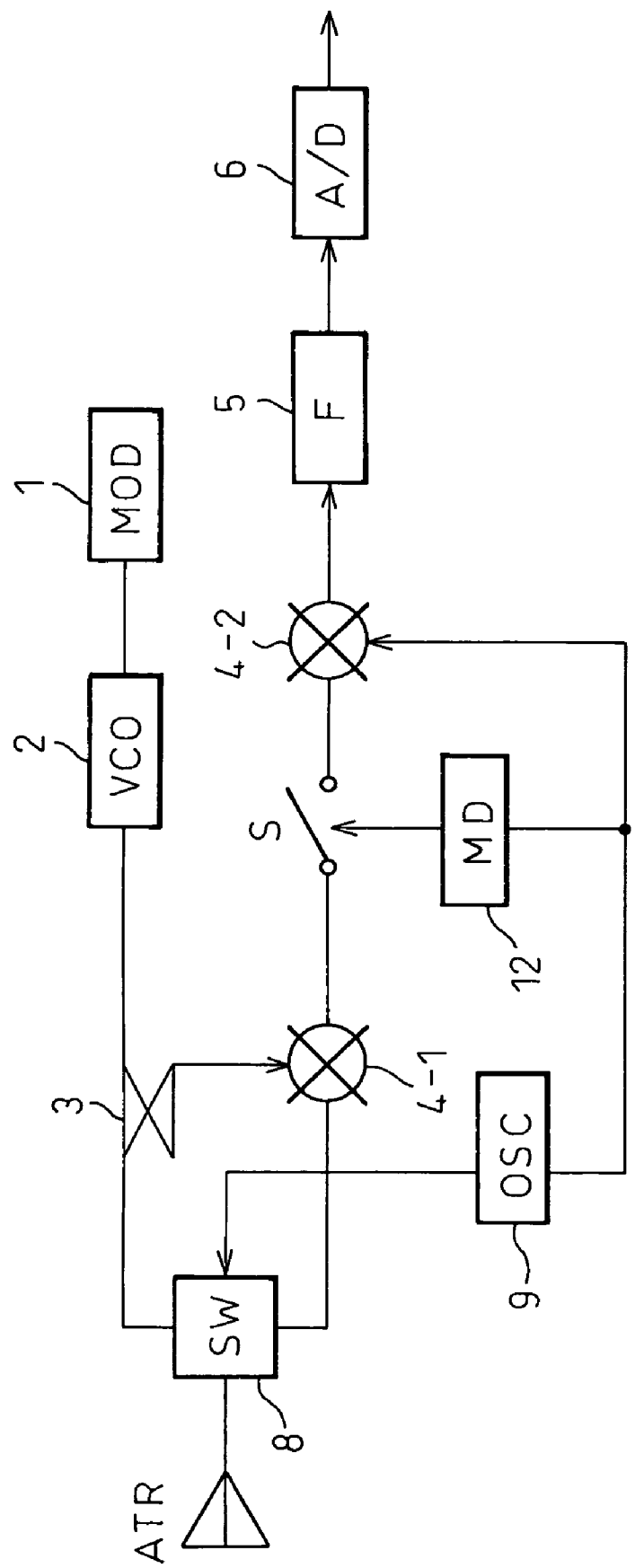
FIG. 16 is a diagram showing the configuration of a sixth embodiment of the present invention.

FIG. 16 is a diagram showing the configuration of a transmit-receive FM-CW radar according to a sixth embodiment of the present invention. This embodiment is a modification of the fourth embodiment shown in FIG. 14; that is, the mode selector 11 is replaced by a mode controller (MD) 12 operable in a specific mode, and the on/off operation of the switch S is controlled based on the specific mode.

For example, when the MD 12 for the specific mode is set as the controller for the short-range mode, the on/off timing of the switch S is the same as that shown in FIG. 9A or FIG. 10A. When the MD 12 is set as the controller for the mid-range mode, the switch S is turned on and off with the timing shown in FIG. 9B or FIG. 10B, while when the MD 12 is set as the controller for the long-range mode, the switch S is turned on and off with the timing shown in FIG. 9C or FIG. 10C.

The MD 12 controls the switch S in the specific mode based on the signal of frequency $f_{sw}$ supplied from the OSC 9.

EMBODIMENT 7

Figure 17:
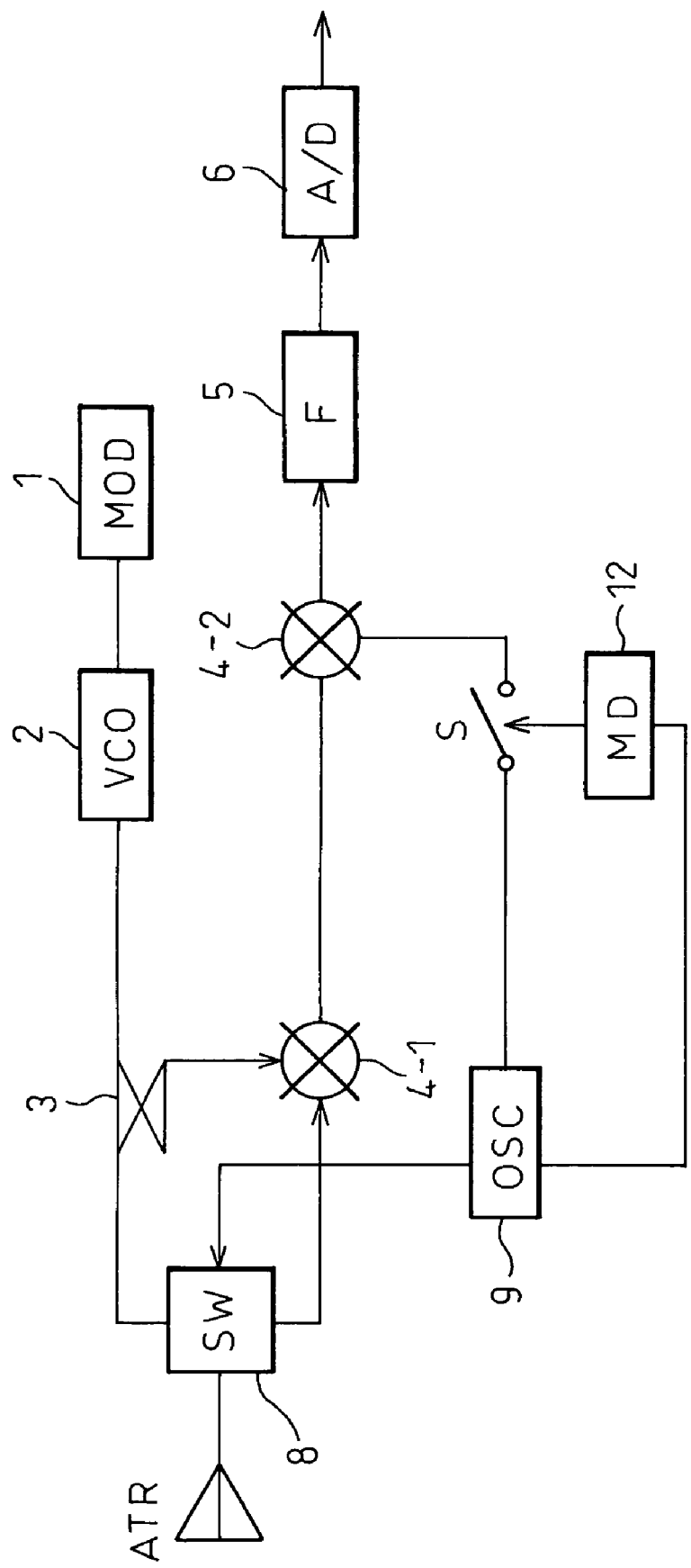
FIG. 17 is a diagram showing the configuration of a seventh embodiment of the present invention.

FIG. 17 is a diagram showing the configuration of a transmit-receive FM-CW radar according to a seventh embodiment of the present invention. This embodiment is a modification of the fifth embodiment shown in FIG. 15; that is, the mode selector 11 is replaced by a mode controller (MD) 12 operable in a specific mode, and the on/off operation of the switch S is controlled based on the specific mode.

For example, when the MD 12 for the specific mode is set as the controller for the short-range mode, the on/off timing of the switch S is the same as that shown in FIG. 9A or FIG. 10A. When the MD 12 is set as the controller for the mid-range mode, the switch S is turned on and off with the timing shown in FIG. 9B or FIG. 10B, while when the MD 12 is set as the controller for the long-range mode, the switch S is turned on and off with the timing shown in FIG. 9C or FIG. 10C.

The MD 12 controls the switch S in the specific mode based on the signal of frequency $f_{sw}$ supplied from the OSC 9.

EMBODIMENT 8

Figure 18A:
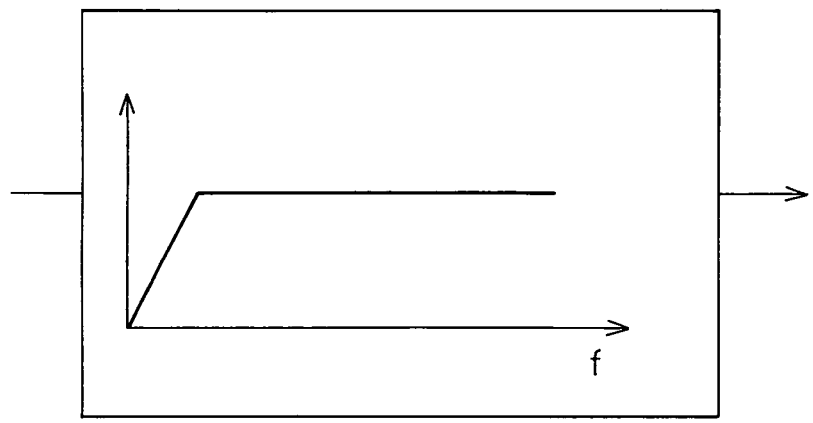
FIGS. 18A, 18B, and 18C are diagrams showing filter characteristics according to an eighth embodiment of the present invention.
Figure 18B:
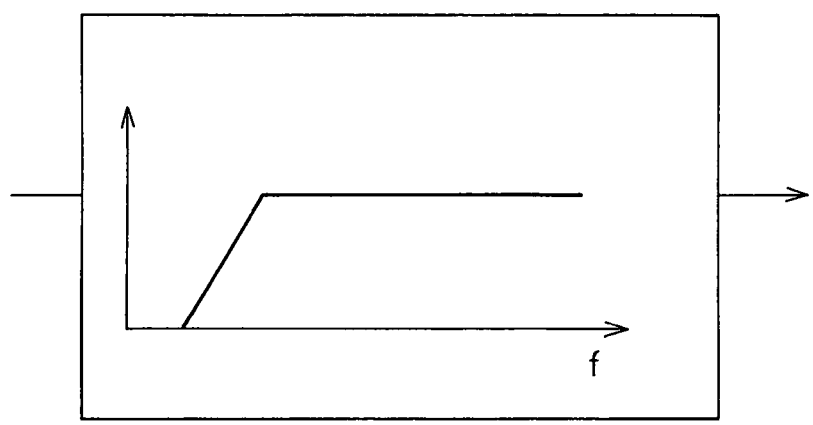
Figure 18C:
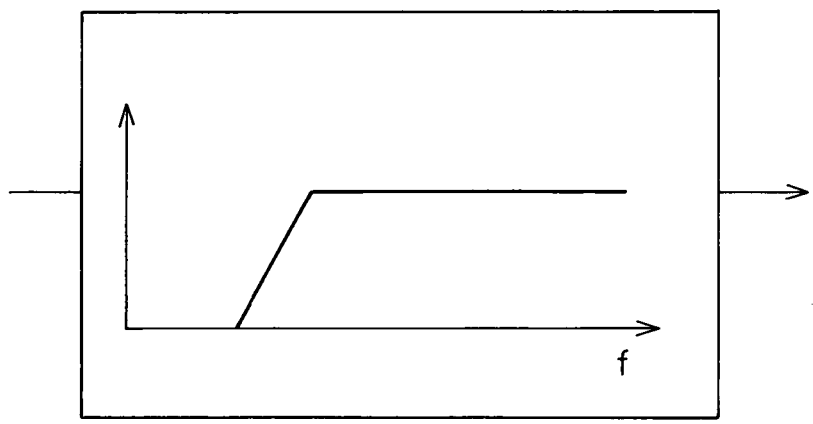

FIGS. 18A to 18C are diagrams showing filter characteristics in a transmit-receive FM-CW radar according to an eighth embodiment of the present invention. In the eighth embodiment, the characteristics of the filters provided for the respective mixers in the transmit-receive FM-CW radars shown in FIGS. 7, 11, and 12 are varied in accordance with the respective modes, thereby efficiently reducing the FM-AM conversion noise.

FIG. 18A shows the characteristic of the filter for the beat signal containing the signal from the short-range target, FIG. 18B shows the characteristic of the filter for the beat signal containing the signal from the mid-range target, and FIG. 18C shows the characteristic of the filter for the beat signal containing the signal from the long-range target. Much of the noise is contained in the beat signal containing the signal from the short-range target. Accordingly, as shown in FIGS. 18B and 18C, the filter for the mid range and the filter for the long range are each constructed to have a characteristic that cuts off the low-frequency components of the beat signal, thus cutting off the signal from the short-range target to remove the noise contained therein.

What is claimed is:

1. A transmit-receive FM-CW radar apparatus which switches between transmission and reception by time division control, comprising:
   a plurality of switches configured to turn on and off an IF signal;
   a plurality of mixers, each of which is associated with a unique one of said switches, each mixer configured to downconvert said IF signal which is input to said mixer when an associated one of said switches is on;
   a plurality of switch controllers, each of which is associated with a unique one of said switches, the switch controllers configured to control said switches on and off in a plurality of modes in which timings of said on and off of said switches are different depending on a distance from a target, and configured to select said IF signal in said plurality of modes for supply to said mixers.

2. A transmit-receive FM-CW radar apparatus as claimed in claim 1, wherein said plurality of modes consist of a short-range mode for selecting an IF signal containing a signal from a short-range target, a mid-range mode for selecting an IF signal containing a signal from a mid-range target, and a long-range mode for selecting an IF signal containing a signal from a long-range target.

3. A transmit-receive FM-CW radar apparatus as claimed in claim 1, wherein said plurality of modes consist of a mode for selecting an IF signal corresponding to a portion occupying up to about ⅓ from a leading edge of a receive timing interval, a mode for selecting an IF signal corresponding to a portion occupying up to about ⅔ from the leading edge of said receive timing interval, and a mode for selecting an IF signal corresponding to an entire portion of said receive timing interval.

4. A transmit-receive FM-CW radar apparatus as claimed in claim 1, wherein said plurality of modes consist of a mode for selecting an IF signal corresponding to a portion occupying up to about ⅓ from a leading edge of a receive timing interval, a mode for selecting an IF signal corresponding to a portion occupying from about ⅓ to ⅔ from the leading edge of said receive timing interval, and a mode for selecting an IF signal corresponding to a portion occupying from about ⅔ to ⅗ from the leading edge of said receive timing interval.

5. A transmit-receive FM-CW radar apparatus which switches between transmission and reception by time division control, comprising:
- a mixer for downconverting an IF signal;
- a switch provided on an input side of said mixer; and
- a switch controller for controlling said switch on and off in different modes and selecting said IF signal in said different modes for supply to said mixer;
- wherein said plurality of modes comprise a mode for selecting an IF signal corresponding to a portion occupying up to about ⅓ from a leading edge of a receive timing interval, a mode for selecting an IF signal corresponding to a portion occupying up to about ⅔ from the leading edge of said receive timing interval, and a mode for selecting an IF signal corresponding to an entire portion of said receive timing interval.

6. A transmit-receive FM-CW radar apparatus which switches between transmission and reception by time division control, comprising:
- a mixer for downconverting an IF signal;
- a switch provided on an input side of said mixer; and
- a switch controller for controlling said switch on and off in different modes and selecting said IF signal in said different modes for supply to said mixer;
- wherein said plurality of modes comprise a mode for selecting an IF signal corresponding to a portion occupying up to about ⅓ from a leading edge of a receive timing interval, a mode for selecting an IF signal corresponding to a portion occupying from about ⅓ to about ⅔ from the leading edge of said receive timing interval, and a mode for selecting an IF signal corresponding to a portion occupying from about ⅔ to about ⅗ from the leading edge of said receive timing interval.

* * * * *

UNITED STATES PATENT AND TRADEMARK OFFICE
CERTIFICATE OF CORRECTION

PATENT NO. : 7,123,184 B2
APPLICATION NO. : 10/802642
DATED : October 17, 2006
INVENTOR(S) : Shono It is certified that error appears in the above-identified patent and that said Letters Patent is hereby corrected as shown below:

On the Title Page

(56) References Cited   Delete "B1",
U.S. Patent Documents   Insert --B2--
pg. 2, Column 1
6,646,589...

(56) References Cited   Delete "Bl",
U.S. Patent Documents   Insert --B2--
pg. 2, Column 1
6,664,919...

(56) References Cited   Delete "Bl",
U.S. Patent Documents   Insert --B2--
pg. 2, Column 1
6,833,807...

(56) References Cited   Delete "B1",
U.S. Patent Documents   Insert --B2--
pg. 2, Column 1
6,972,711...

In the Specification

Column 1, line 24   After "FM radar",
                    Insert --and--

Column 4, line 2    After "the mode",
                    Insert --switching--

UNITED STATES PATENT AND TRADEMARK OFFICE
CERTIFICATE OF CORRECTION

PATENT NO.         : 7,123,184 B2
APPLICATION NO. : 10/802642
DATED              : October 17, 2006
INVENTOR(S)        : Shono It is certified that error appears in the above-identified patent and that said Letters Patent is hereby corrected as shown below:

In the Claims

| | |
|---|---|
| Column 14, line 40, Claim 1 | After "switches is on;", Insert --and-- |
| Column 15, line 3, Claim 4 | After "1/3 to", Insert --about-- |
| Column 15, line 6, Claim 4 | After "2/3 to", Insert --about-- |

Signed and Sealed this

Tenth Day of July, 2007

JON W. DUDAS
*Director of the United States Patent and Trademark Office*